US009070273B2

(12) United States Patent
Lombardi et al.

(10) Patent No.: US 9,070,273 B2
(45) Date of Patent: Jun. 30, 2015

(54) COMMUNICATIONS DEVICE HAVING BATTERY MONITORING CAPABILITIES AND PERFORMING PRE-SCHEDULED EVENTS (71) Applicant: RESEARCH IN MOTION LIMITED, Waterloo (CA)

(72) Inventors: Robert Joseph Lombardi, Hamilton (CA); Jasmin Mulaosmanovic, Waterloo (CA); Mark David Mesaros, Cambridge (CA); Michael Andrew Goldsmith, Woodstock (CA)

(73) Assignee: BlackBerry Limited, Waterloo, Ontario (CA)

( * ) Notice: Subject to any disclaimer, the term of this patent is extended or adjusted under 35 U.S.C. 154(b) by 179 days.

(21) Appl. No.: 13/749,389

(22) Filed: Jan. 24, 2013

(65) Prior Publication Data
US 2014/0203944 A1  Jul. 24, 2014

(51) Int. Cl.
G08B 1/08 (2006.01)
G08B 21/00 (2006.01)
H04B 1/38 (2006.01)
G08B 21/18 (2006.01)
H04W 24/00 (2009.01)

(52) U.S. Cl.
CPC ............ *G08B 21/182* (2013.01); *H04W 24/00* (2013.01)

(58) Field of Classification Search
None
See application file for complete search history.

(56) References Cited

U.S. PATENT DOCUMENTS

| 5,715,465 | A | 2/1998 | Savage et al. |
| 6,725,069 | B2 | 4/2004 | Sprigg et al. |
| 8,218,403 | B2 | 7/2012 | Scott et al. |
| 2006/0001402 | A1 | 1/2006 | Kim et al. |
| 2006/0135100 | A1 | 6/2006 | Fang et al. |
| 2008/0132221 | A1 | 6/2008 | Willey |
| 2008/0201587 | A1 | 8/2008 | Lee |
| 2009/0143114 | A1 | 6/2009 | Vargas et al. |
| 2009/0187780 | A1* | 7/2009 | Keohane et al. ............... 713/324 |
| 2010/0151918 | A1 | 6/2010 | Annambhotla et al. |
| 2011/0071780 | A1 | 3/2011 | Tarkoma |
| 2011/0080422 | A1* | 4/2011 | Lee et al. ....................... 345/589 |
| 2012/0210325 | A1* | 8/2012 | Wijngaarden et al. ........ 718/103 |
| 2013/0227318 | A1* | 8/2013 | Musial et al. .................. 713/320 |

FOREIGN PATENT DOCUMENTS

| GB | 1497556 A | 1/1978 |
| GB | 2489572 A1 | 10/2012 |
| WO | 9734218 A1 | 9/1997 |
| WO | 0052847 A1 | 9/2000 |

OTHER PUBLICATIONS

Research in Motion Limited, User Guide BlackBerry pearl 8130 Smartphone, 2008, pp. 1-267, Canada.
Nokia Corporation, Nokia X6-00 User guide, 2011, pp. 1-183, Issue 5.4.
Samsung, Samsung Mobile function guide, pp. 1-125, Apr. 2010, Rev 1.1 (http://www.samsungmobile.com).
Extended European Search report mailed Jul. 8, 2013, in corresponding European patent application No. 13152477.9.

* cited by examiner

*Primary Examiner* — Julie Lieu
(74) *Attorney, Agent, or Firm* — Fish & Richardson P.C.

(57) ABSTRACT

Methods and devices are provided for monitoring a battery to determine whether sufficient battery power remains to perform an event at a pre-scheduled time. A communications device includes a processor that receives instructions to perform the event at the pre-scheduled time, determines a first amount of time until the event is performed, detects an idle mode of the communications device, the idle mode consuming a minimum amount of power, calculates a second amount of time until the battery is depleted, the second amount of time being calculated while the communications device operates in the idle mode, determines whether the second amount of time is less than the first amount of time, activates a first alert if the second amount of time is less than the first amount of time while remaining in the idle mode, and performs an action prior to the pre-scheduled time while remaining in the idle mode.

20 Claims, 5 Drawing Sheets

COMMUNICATIONS DEVICE HAVING BATTERY MONITORING CAPABILITIES AND PERFORMING PRE-SCHEDULED EVENTS

FIELD OF THE DISCLOSURE

This disclosure relates generally to mobile communication devices, and more particularly, to a mobile communication device configured to monitor battery power and generate an alert if insufficient battery power is available to perform a pre-scheduled event at a programmed time.

BACKGROUND

The popularity of mobile communication devices has led to their use for tasks other than voice or data communications. For example, many prefer to rely on the alarm clock features of mobile communication devices rather than rely on stand-alone alarm clocks. Often, a user has an important engagement to attend in the morning and sets the alarm clock on her mobile communication device the night before to assure that they awake with sufficient time to get ready. However, the user often neglects to check the battery charge level on their mobile communication device when they set the alarm the night before or mistakenly believe there is sufficient battery life available to activate the alarm in the morning. Typically, the mobile communication device runs features in the background that consume battery power when the mobile communication device is not being used. For example, the mobile communication device may poll communication towers for location information. If the battery drains during the night without a warning to the user, the alarm will not go off, and the user will not be awakened by the alarm feature at a desired time.

Existing mobile communication devices are not configured to predict battery power requirements in real time nor generate an alert if the battery power is expected to drain prior to the occurrence of the pre-scheduled event. Rather, existing mobile communication devices simply enter a full shut-down mode with limited or no warning, thereby preventing occurrence of the programmed event. A mobile communication device is needed that is configured to monitor the real-time battery power, predict real-time power requirements of the mobile communication device, and generate an alert upon determination that there is insufficient battery power to perform the pre-scheduled event at the programmed time.

DETAILED DESCRIPTION

This disclosure describes a mobile communication device configured to monitor battery power, predict real-time power requirements based on operations performed thereon, and generate an alert upon determining that there is insufficient battery power to perform a pre-scheduled event at a programmed time. The pre-scheduled event may include an alarm event, a reminder event, a delayed email sending event, a notification event, a calendar reminder event, a messaging event, an updating event, or the like.

According to one example, the alert may include generating a signal at the time the event is initially scheduled if the mobile communication device determines that insufficient battery power level remains to perform the pre-scheduled event at the programmed time. Alternatively, the alert may include generating a signal after the event is initially scheduled, but before the pre-scheduled event is performed, if the battery power level of the mobile communication device becomes insufficient to perform the pre-scheduled event at the programmed time. For example, the mobile communication device may perform operations after the scheduling of the pre-scheduled event that reduces the battery power to a level that is insufficient to perform the pre-scheduled event at a subsequently programmed time. Examples of battery consuming operations performed on the mobile communication device may include device monitoring operations, device tracking operations, cellular handoff operations, global positioning system operations, processor operations, or the like.

According to one example, the operating system is programmed to continuously monitor battery consumption characteristics and the battery power level at the mobile communication device. The operating system is further programmed to monitor operations performed on the mobile communication device, predict real-time power requirements of the mobile communication device, and generate an alert if a determination is made that there is insufficient battery power to perform the pre-scheduled event at the programmed time. For example, the operating system monitors the battery power level of the mobile communication device in real-time and the battery load in real-time to predict whether there will be sufficient battery power remaining to perform the pre-scheduled event at the programmed time. If, prior to the occurrence of the pre-scheduled event, the operating system calculates that there will be insufficient battery power to perform the pre-scheduled event, actions may be taken to alert the user of this condition before the battery power is depleted. For example, the operating system may generate a signal notifying the user that the battery will be depleted prior to occurrence of the pre-scheduled event. The user may be notified by an alarm at the time the pre-scheduled event is programmed or at some later time prior to occurrence of the pre-scheduled event. The alarm may include a visual alert, an audible alert, a vibrate only alert, a message alert, or the like. The alarm may be scheduled for delivery during an authorized period of time or at any time.

According to one example, a computer-implemented method is provided for monitoring battery power level and estimating power consumption of a mobile communication device. The method includes obtaining power data that is processed to identify current power requirements of the mobile communication device and anticipated power requirements of the mobile communication device. The power data may include instantaneous battery draw data, average battery draw data, active application battery draw data, background application battery draw data, battery capacity data, battery discharge data, battery condition data, idle communication battery draw data, active communication battery draw data, device power usage history data, or the like. The method also may obtain time-based data, including current time data, programmed pre-scheduled event time data, device active-use time data, device idle-time data or the like. Based at least on the power data and the time-based data, the mobile communication device may be configured to set-up the pre-scheduled event or activate an alert advising that the battery power will be depleted prior to occurrence of the pre-scheduled event. In another example, a computer program product is provided on a computer readable medium for performing this computer-implemented method.

Figure 1:
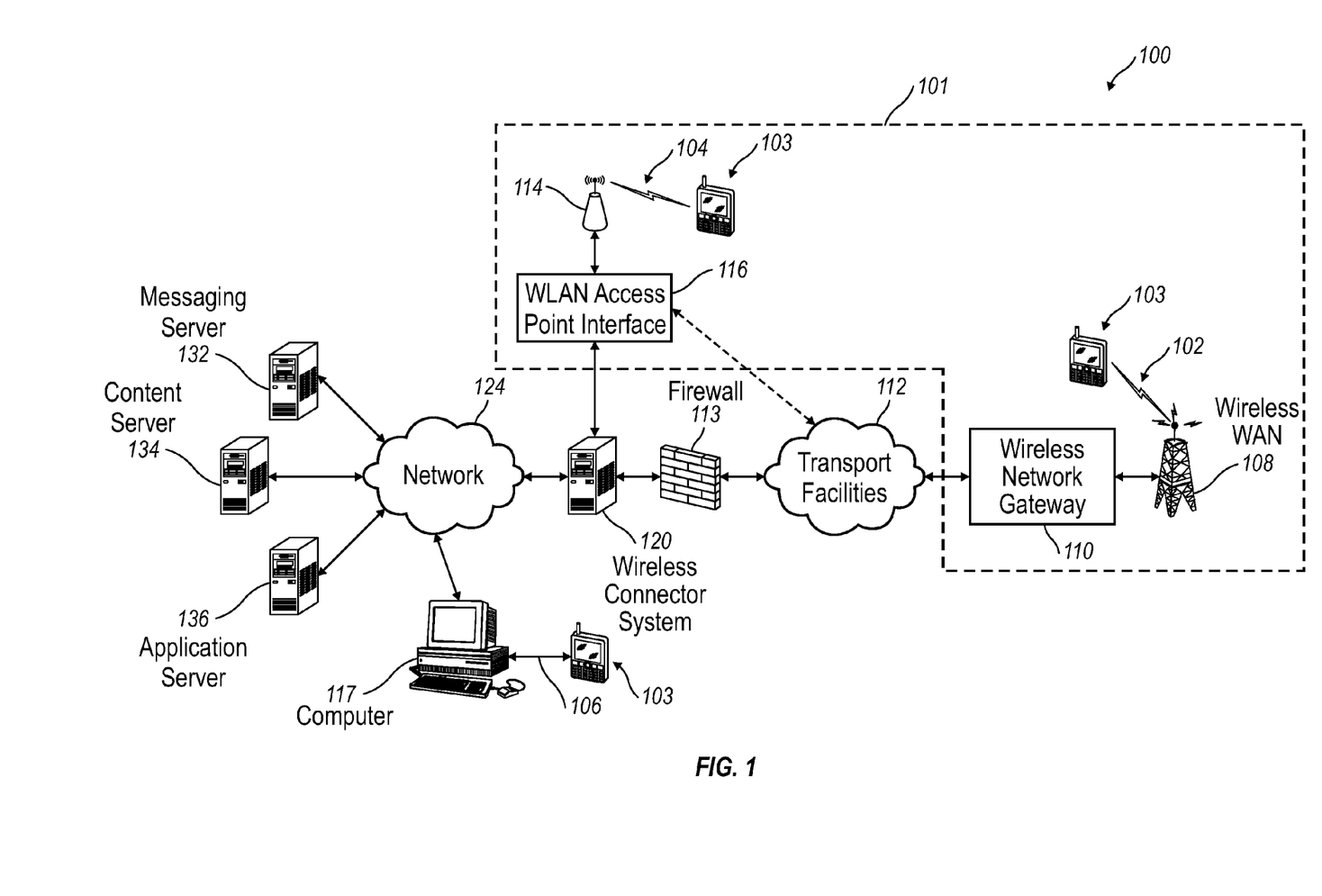
FIG. 1 is a communication system for mobile communication devices according to one example.

FIG. 1 illustrates an example of an operating environment for a communication system 100 that may include a number of mobile communication devices 103. The communication system 100 supports the mobile communication devices 103 in any of several different ways. The mobile communication devices 103 may be communicatively coupled to wireless digital networks 101, such as one or more of a Wireless Wide Area Network (WWAN) 102 and a Wireless Local Area Network (WLAN) 104, among other suitable network arrangements. In some examples, the mobile communication devices 103 may be configured to communicate over the WWAN 102, the WLAN 104, or to roam between these networks. In some examples, the wireless digital networks 101 may comprise multiple WWANs 102 and WLANs 104, among other configurations.

The WWAN 102 may be implemented as any suitable wireless access network technology. By way of example, but not limitation, the WWAN 102 may be implemented as a wireless digital network that includes a number of transceiver base stations 108, one of which is shown in FIG. 1. The WWAN 102 typically is operated by a mobile network service provider that provides subscription packages to users of the mobile communication devices 103.

The WWAN 102 may communicate with a wireless network gateway 110 that couples the mobile communication devices 103 to transport facilities 112. The transport facilities 112 couple the mobile communication devices 103 to a wireless connector system 120. The transport facilities 112 may include one or more private networks or lines, the Internet, a virtual private network, or any other suitable network, among other transport facilities. The wireless connector system 120 may be operated, for example, by an organization or enterprise such as a corporation, university, or governmental department, among other organizations or enterprises, which allow access to a network 124, such as an internal or enterprise network (e.g., an intranet) and its resources. Alternatively, the wireless connector system 120 may be operated by a mobile network provider. In some examples, the network 124 may be realized using the Internet rather than, or in addition to, an internal or enterprise network.

The wireless network gateway 110 provides an interface between the wireless connector system 120 and the WWAN 102. The wireless network gateway 110 facilitates communication between the mobile communication devices 103 and other devices (not shown) that may be connected, directly or indirectly, to the WWAN 102. Accordingly, communications sent via the mobile communication devices 103 are transported via the WWAN 102, the wireless network gateway 110 and the transport facilities 112 to the wireless connector system 120. Communications sent from the wireless connector system 120 are received by the wireless network gateway 110 and transported via the WWAN 102 to the mobile communication devices 103.

The WLAN 104 may be a user's personal network, an enterprise network, or a hotspot offered by an Internet service provider (ISP), a mobile network provider, or a property owner in a public or semi-public area, for example. The access points 114 may be connected to an access point (AP) interface 116 that may connect to the wireless connector system 120 directly or indirectly. A direct connection may be provided when the access point 114 is part of an enterprise WLAN 104 in which the wireless connector system 120 resides. An indirect connection may be provided via the transport facilities 112, as indicated by the dashed signal line in FIG. 1, if the access point 114 is a personal Wi-Fi network or Wi-Fi hotspot. In this case, a mechanism, such as a virtual private network (VPN), may be used for securely connecting to the wireless connector system 120. The AP interface 116 may provide translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that may connect to the wireless connector system 120.

The wireless connector system 120 allows the mobile communication devices 103 to access the network 124 and connected resources and services, such as a messaging server 132; a content server 134 that provides content, such as Internet content or content from an organization's internal servers; application servers 136 that implement server-based applications, and intranet file services; among other connected resources and services.

The network 124 may comprise a private local area network (LAN), metropolitan area network (MAN), wide area network (WAN), the public Internet or combinations thereof. The network 124 may include virtual networks constructed using any of these networks, alone or in combination. Alternatively, the mobile communication device 103 may connect to the wireless connector system 120 using a computer 117, such as a desktop or a notebook computer, via the network 124. A link 106 may be provided between the mobile communication device 103 and the computer 117 for exchanging information between the mobile communication device 103 and a computer 117 connected to the wireless connector system 120. The link 106 may include one or both of a physical interface or a short-range wireless communication interface.

The physical interface may comprise one or a combination of an Ethernet connection, a Universal Serial Bus (USB) connection, a Firewire™ (also known as an IEEE 1394 interface) connection, or other serial data connections, via respective ports or interfaces of the mobile communication device 103 and the computer 117. The short-range wireless communication interface may be a personal area network (PAN) interface. A PAN is a wireless point-to-point connection implemented without physical cables to connect the two end points. The short-range wireless communication interface may include one or a combination of an infrared (IR) connection, such as an Infrared Data Association (IrDA) connection, a short-range radio frequency (RF) connection, such as one specified by IEEE 802.15.1 or the BLUETOOTH special interest group, or IEEE 802.15.3a, also referred to as Ultra-Wideband (UWB), or other PAN connection.

The wireless network gateway 110 is configured to send data packets received at the mobile communication device 103 over the WWAN 102 to the wireless connector system 120. The wireless connector system 120 then sends the data packets to the appropriate connection point such as a messaging server 132 or a content server 134 or an application server 136, or a combination of these. Conversely, the wireless connector system 120 may send data packets received from the messaging server 132, the content servers 134, the application servers 136 or any combination of these, to the wireless network gateway 110 for transmission to a selected mobile communication device 103. The WLAN AP interfaces 116 associated with the WLAN 104 provides similar transmission functions between the mobile communication device 103, the wireless connector system 120 and network connection point, such as the messaging server 132, the content server 134, the application server 136, or any combination of these.

It will be appreciated that the above-described communication system 100 is provided for illustration purposes only. The above-described communication system 100 may be implemented using any of a multitude of network configurations for use with the mobile communication devices 103. Suitable variations of the communication system 100 will be readily appreciated by a person of ordinary skill in the art and are intended to fall within the scope of the present disclosure.

Figure 2:
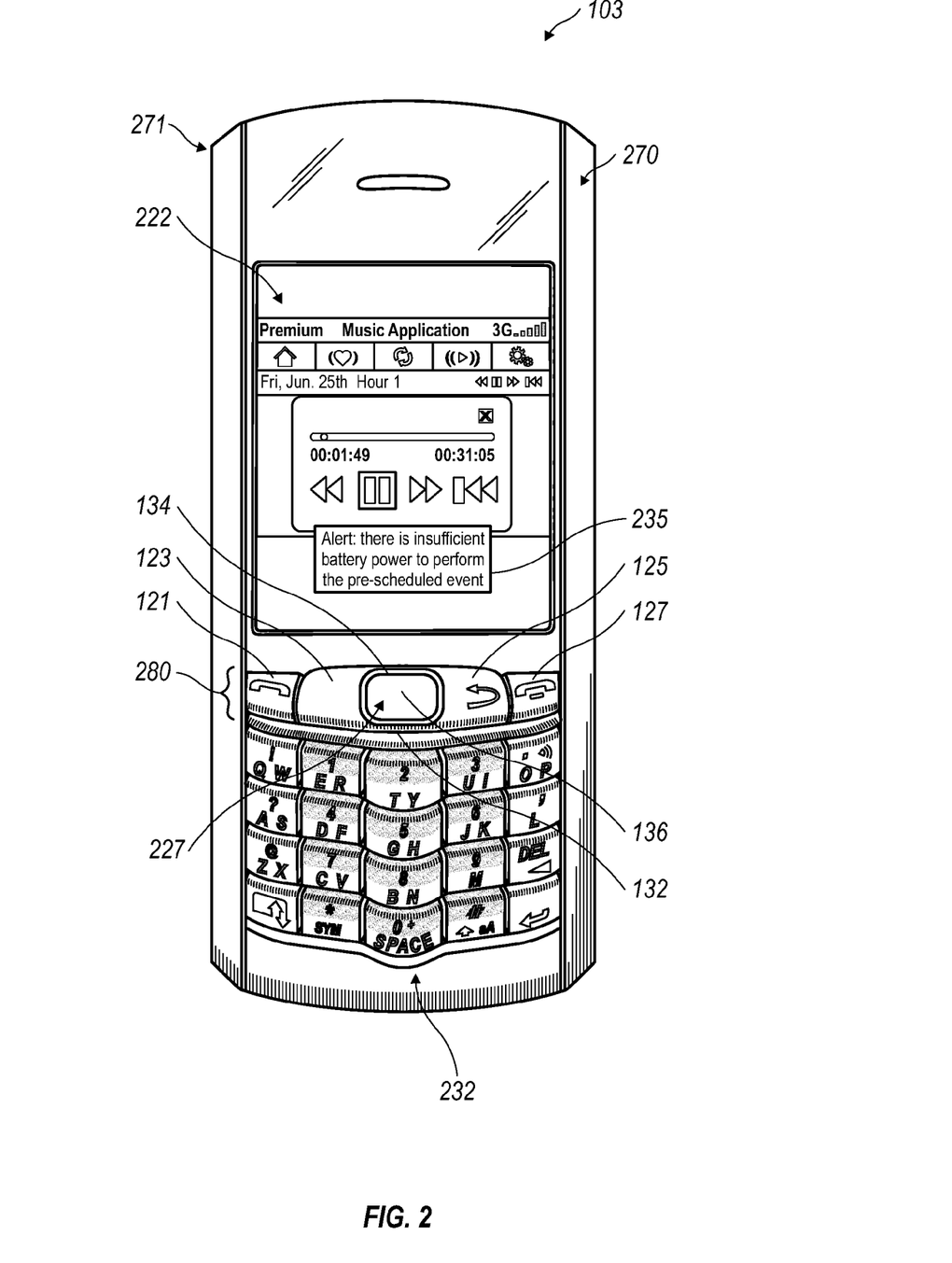
FIG. 2 is a mobile communication device according to one example, the mobile communication device including an application for alerting of insufficient battery power.

FIG. 2 illustrates an example of a mobile communication device 103 having a display 222 positioned above a keyboard 232 or other suitable device for accommodating textual input to the mobile communication device 103. In accordance with an aspect of the disclosure, the mobile communication device 103 may include a front face 270 having a navigation row 280.

According to one example, a music player application is currently active as shown by the graphical user interface (GUI) illustrated on the display 222. A battery monitoring application 359 (See FIG. 3) operates in a background mode on the mobile communication device to continuously monitor battery conditions and power consumption conditions. A pre-scheduled event application 350 (See FIG. 3) also operates in a background mode to obtain and store pre-scheduled event data obtained from various device applications. According to one example, the pre-scheduled event application 350 obtains pre-scheduled event data from various applications, including a clock application, a calendar application, an email application, a messaging application, a social media application, or the like.

The battery monitoring application 359 monitors battery consumption and battery power at the mobile communication device 103 in real time to predict when battery power will be depleted. The battery monitoring application 359 takes into consideration current device conditions and other historical or statistical information about device usage and battery consumption. The battery monitoring application 359 communicates with the pre-scheduled event application 350 to determine whether the predicted battery depletion will prevent occurrence of one or more pre-scheduled events. According to one example, a window 235 is populated on the display 222 to alert a user that insufficient battery power remains to perform the pre-scheduled event. Alternatively, the window 235 may be populated to alert a user to close the active application within an identified time period to preserve sufficient battery power to perform the pre-scheduled event.

The mobile communication device 103 may include an input device 227 that acts as a cursor navigation tool. The input device 227 may be exteriorly located upon the front face 270 of the mobile communication device 103. The location of input device 227 on the front face 270 allows the cursor navigation tool to be thumb-actuable, e.g., like the keys of the keyboard 232. Some examples provide the input device 227 in the form of an optical navigation tool that may be utilized to instruct two-dimensional screen cursor movement in substantially any direction. The input device 227 may act as an actuator when the cursor navigation tool is depressed like a button. Other examples may provide the input device 227 in the form of a track pad, a touchpad, a trackball, a pointing stick, a joystick, a graphics tablet, or the like. The input device 227 may be placed above the keyboard 232 and below the display 222. In this location, the input device 227 may avoid interference during data entry and does not block the operator's view of the display screen 222 during use.

The mobile communication device 103 includes various features and applications available to the user including an alarm clock program that may be accessed through an alarm clock icon (not shown). The alarm clock program allows the user to perform a series of steps in order to set a programmed alarm time. For example, the user could select the alarm clock program on mobile communication device 103 by touching or otherwise selecting an alarm clock icon presented on the display 222. After a series of prompts, the user may set a desired time to active the alarm. If the user does not have access to a power outlet or phone charger, or simply forgets to plug the mobile communication device 103 into the power outlet, there is a possibility that the battery of the mobile communication device 103 will be depleted before the alarm is activated at the programmed time. In this circumstance, the window 235 is populated on the display 222 to alert a user if insufficient battery power remains to perform the pre-scheduled event. Alternatively, the window 235 may be populated to alert a user to close the active application within an identified time period to preserve sufficient battery power to perform the pre-scheduled event.

Figure 3:
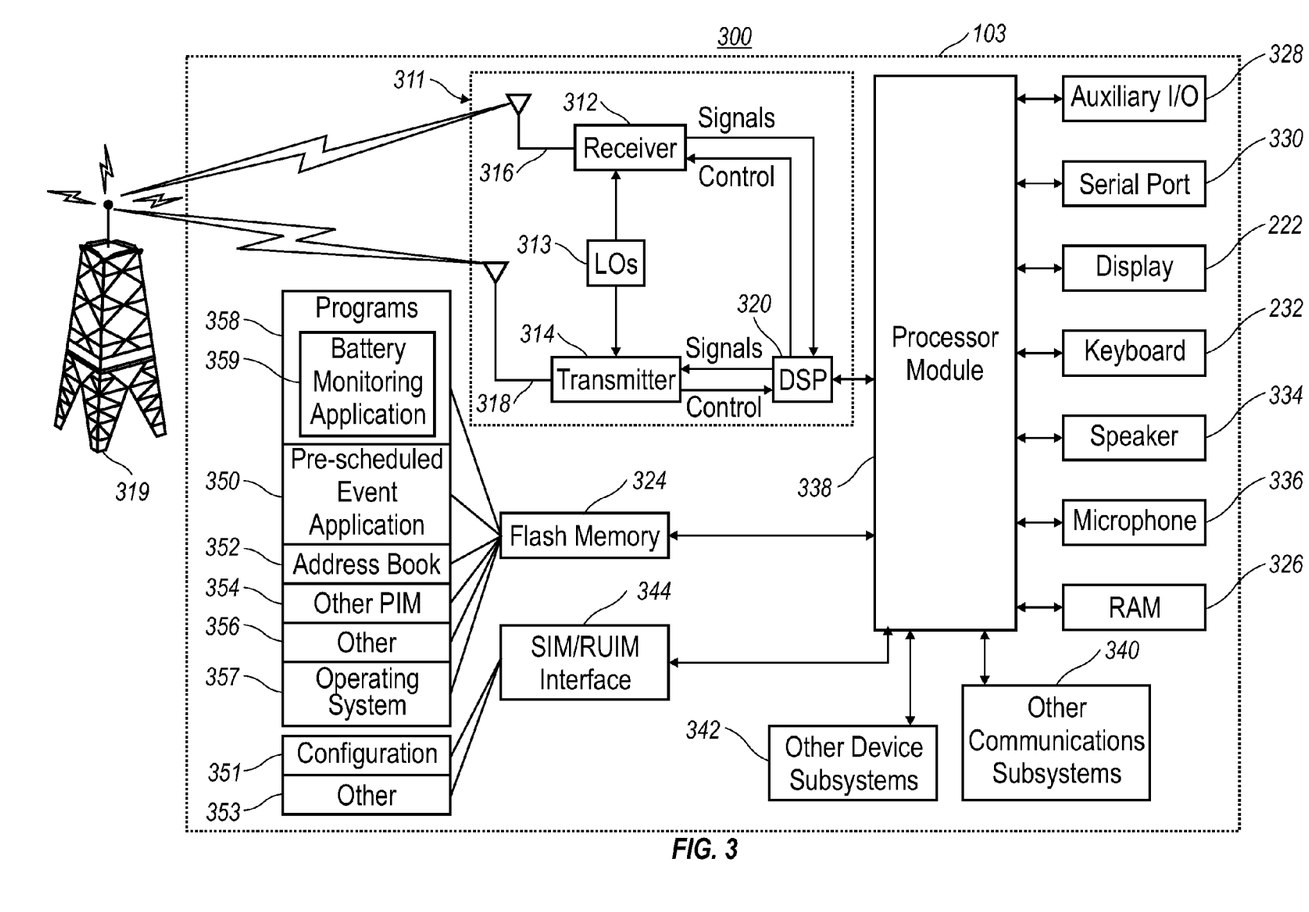
FIG. 3 is a block diagram of the mobile communication device illustrated in FIG. 2 operating in a communication environment according to one example.

FIG. 3 illustrates a block diagram 300 of the mobile communication device 103 in accordance with one example. The mobile communication device 103 includes a microprocessor 338 that controls operations of the mobile communication device 103. A communication subsystem 311 is provided to perform communications, including transmission and reception of analog data and digital data via the wireless digital communication network 319 and a wireless analog broadcast system 145. The communication subsystem 311 may support short range digital communication systems, such as a BLUETOOTH® communication module or a WI-FI™ communication module. The WI-FI™ communication module may comply with IEEE 802.11x, and associated circuits and components.

Alternatively, one of ordinary skill in the art will appreciate that the communication subsystem 311 may be implemented using more than one component. For example, the mobile communication device 103 may include other communication subsystems 340 and other device subsystems 342 to perform communication operations.

Alternatively, the communication subsystem 340 may include a short range communication system, such as a BLUETOOTH® communication module or a WI-FI™ communication module, such as a communication module in compliance with IEEE 802.11b, and associated circuits and components. Additionally, the microprocessor 338 may be configured to perform operating system functions that enable execution of programs on the mobile communication device 103. For example, microprocessor 338 may enable execution of an alarm program, which allows a user to set a designated time in which the alarm will sound, and which activates the alarm at the programmed time.

The microprocessor 338 is configured with operating system functionality to enable program execution on the mobile communication device 103. For example, the microprocessor 338 may be communicatively coupled to an auxiliary input/output (I/O) subsystem 328 and a serial port 330, such as a Universal Serial Bus port, which enables communications with other devices or systems. The display 222 may be communicatively coupled to the microprocessor 338 to display a GUI on the mobile communication device 103. When the mobile communication device 103 is equipped with a keyboard 232, the keyboard 232 also may be communicatively coupled with the microprocessor 338. The mobile communication device 103 may include a speaker 334, a microphone 336, a random access memory (RAM) 326, and a flash memory 324, among other components. These components may be communicatively coupled to the microprocessor 338. One of ordinary skill will appreciate that fewer components may be included in the mobile communication device 103. For example, the keyboard 232 may be a virtual keyboard that is integrated with a touch screen rather than being provided as a separate component.

The auxiliary I/O subsystem 328 may take the form of a variety of different navigation tools, including multi-directional or single-directional navigation tools. The navigation tools may include an optical navigation tool, a trackball navigation tool, a thumbwheel, a navigation pad, a joystick or a touch-sensitive interface, among other I/O interfaces. According to one example, the navigation tool may include the optical navigation tool 227 illustrated in FIG. 2. The navigation tool may be located on the front surface of the mobile communication device 103 or may be located on any exterior surface of the mobile communication device 103.

Other auxiliary I/O subsystems may include external display devices and externally connected keyboards (not shown). While the above examples have been provided in relation to the auxiliary I/O subsystem 328, other subsystems capable of providing input or receiving output from the mobile communication device 103 are considered within the scope of this disclosure. Additionally, other keys may be placed along the side of the mobile communication device 103 to function as escape keys, volume control keys, scrolling keys, power switches, or user programmable keys, and may likewise be programmed accordingly.

The keyboard 232 may include a plurality of keys that are physical in nature, such as actuable buttons. Alternatively, the keyboard 232 may be implemented as a virtual keyboard with software instructions provided to represent physical keys (referred to herein as "virtual keys") on the display 222. It is also contemplated that user input may be provided as a combination of these two types of keys. Each key of the plurality of keys may be associated with at least one action, which may be the input of a character, a command or a function, among other actions. In this context, "characters" are contemplated to include, for example, alphabetic letters, language symbols, numbers, punctuation, insignias, icons, pictures, or blank space, among other characters.

In the case of virtual keys, the indicia for the respective keys may be shown on the display screen 222. According to one example, the virtual keys may be selected by touching the display screen 222. A stylus, finger, or other pointer may be used to generate a desired character or activate an indicated command or function. Some examples of display screens 222 that are capable of detecting touch include resistive, capacitive, projected capacitive, infrared and surface acoustic wave (SAW) touch screens. Physical and virtual keys may be combined in many different ways, as appreciated by those skilled in the art.

The mobile communication device 103 may be equipped with components that enable operation of various programs.

A flash memory 324 may be provided to store an operating system 357, device programs 358, and data. The device programs 358 may include a battery monitoring application 359 and a pre-scheduled event application 350. The operating system 357 is generally configured to manage the programs 358. The programs 358 may be stored in the flash memory 324 and may be executed on the microprocessor 338. The operating system 357 honors requests for services made by the programs 358 through predefined program interfaces, among other request types. More specifically, the operating system 357 typically determines the order in which the multiple programs 358 are executed on the microprocessor 338. The operating system 357 also determines an execution time allotted to each program 358, manages sharing of the flash memory 324 among the multiple programs, and handles input and output to and from other device subsystems 342, among performing other operations. As will be described below, operating system 357 and the battery monitoring application 359 communicate with microprocessor 338 to monitor selected parameters in order to determine whether there is sufficient battery power remaining in the mobile communication device 103 to perform the pre-scheduled event at a programmed time.

The battery monitoring application 359 may further monitor the mobile communication device 103 for pre-defined criteria and may generate and send an alert external to the mobile communication device upon detecting the pre-defined criteria. For example, an email application may be accessed to generate and send an electronic signal, such as an electronic message, to an external device upon detecting the pre-defined criteria. A telephone application may be accessed to generate and send a voice message to an external device upon detecting the pre-defined criteria. A social media application may be accessed to generate and send an electronic message to an external device upon detecting the pre-defined criteria, where the electronic message is generated to alert a third party to perform an action at a selected time. For example, a friend may be prompted to initiate a wake-up call at a selected time. The pre-defined criteria may include, for example, a 10% battery power remaining indicator, a cell tower roaming indicator, initiation of a power consuming application, initiation of a multi-media application, activation of a global positioning application, or the like.

According to one example, the battery monitoring application 359 may be a client application that resides on the mobile communication device 103 and is executable on the microprocessor 338. Alternatively, the battery monitoring application 359 may communicate with a remote server application to enable data processing at the remote server.

Additionally, operators may interact directly with the operating system 357 through the display 222. Interactions may be facilitated by input devices, including the keyboard 232, auxiliary input/output device 328, and the display screen 222. While an example of the operating system 357 may be stored in the flash memory 324, the operating system 357 in other examples may be stored in a read-only memory (ROM) or similar storage element (not shown). As those skilled in the art will appreciate, the operating system 357, device program 358 (or parts thereof) may be loaded in a RAM 326 or other volatile memory. Further, the flash memory 324 may be configured to support communication between the battery monitoring application 359, the operating system 357, and microprocessor 338.

Furthermore, the mobile communication device 103 may equipped for two-way communication within the wireless digital communication network 319. Digital signals may be sent and received from a mobile communication service.

Examples of communication systems enabled for two-way communication include, but are not limited to, Long Term Evolution (LTE); General Packet Radio Service (GPRS) networks; Universal Mobile Telecommunication Service (UMTS) networks; Enhanced Data for Global Evolution (EDGE) networks; Code Division Multiple Access (CDMA) networks; High-Speed Packet Access (HSPA) networks; Universal Mobile Telecommunication Service Time Division Duplexing (UMTS-TDD) networks; Ultra Mobile Broadband (UMB) networks; Worldwide Interoperability for Microwave Access (WiMAX) networks, or other networks that can be used for combined data and voice capabilities or separate data and voice capabilities.

For the communication systems listed above, the mobile communication device 103 may use a unique identifier to enable the mobile communication device 103 to transmit and receive signals from the communication network 319. Other systems may not use such identifying information. For example, GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different mobile communication devices 103. The mobile communication device 103 may be able to operate some features without a RUIM or SIM card, but may not be able to communicate with the network 319. A SIM/RUIM interface 344 may be located within the mobile communication device 103 to allow for removal or insertion of the RUIM and SIM card (not shown). The RUIM and SIM card may include a memory that holds key configurations 351 and other information 353, such as identification and subscriber-related information. With a properly enabled mobile communication device 103, two-way communication may be performed between the mobile communication device 103 and the communication network 319.

If the mobile communication device 103 is enabled as described above, or the digital communication network 319 includes such enablement, the two-way communication enabled mobile communication device 103 may be configured to both transmit and receive multi-media content and other data from the communication network 319. The communication transfer may be performed to or from the mobile communication device 103. In order to communicate with the communication network 319, the mobile communication device 103 may be equipped with an integral or internal antenna 318 that transmits signals to the communication network 319. Likewise, the mobile communication device 103 may be equipped with an additional antenna 316 for receiving communication from the communication network 319. According to one example, these antennae 316, 318 may be combined into a single antenna (not shown). As one skilled in the art will appreciate, the antenna or antennae 316, 318 may be externally mounted on the mobile communication device 103 in another example.

When equipped for two-way communication, the mobile communication device 103 may include the communication subsystem 311 that supports the operational needs of the mobile communication device 103. The communication subsystem 311 may include a transmitter 314 and a receiver 312 including an associated antenna or antennae 316, 318 as described above, local oscillators (LOs) 313, and a processing module that in the presently described example is a digital signal processor (DSP) 320.

It is contemplated that communication between the mobile communication device 103 and the wireless network 319 may be any type of communication that both the wireless network 319 and mobile communication device 103 are enabled to support. In general, these communications may be classified as voice and data communications. Voice communication generally refers to communication in which signals for audible sounds are transmitted through the communication network 319 by the mobile communication device 103. Data communication generally refers to all other types of communication that the mobile communication device 103 is capable of performing within the constraints of the wireless network 319.

FIGS. 1, 2 and 3 are examples only and those persons skilled in the art will appreciate that additional elements and modifications may be necessary to make the mobile communication device 103 operate in particular analog broadcast environments and digital network environments. The illustrated examples disclose the mobile communication devices 103 as smart phones. Alternative examples contemplate that the communication devices 103 may include personal digital assistants (PDA), tablet computers, laptop computers, or other communication devices capable of sending and receiving electronic messages. According to one example, the mobile communication devices 103 and the corresponding mobile communication device 300 structure may be characterized by an identification number that is assigned to the mobile communication device 103. According to one example, the identification numbers cannot be changed and are locked to each device.

The disclosed method and system are configured to continuously monitor the mobile communication device for battery consumption characteristics, battery power, operations performed on the mobile communication device, and real-time power requirement predictions of the mobile communication device. An alert is generated if a determination is made that there is insufficient battery power to perform the pre-scheduled event at the programmed time. The method and system include obtaining power data that is processed to identify current power requirements of the mobile communication device and anticipated power requirements of the mobile communication device. The power data may include instantaneous battery draw data, average battery draw data, active application battery draw data, background application battery draw data, battery capacity data, battery discharge data, battery condition data, idle communication battery draw data, active communication battery draw data, device power usage history data, or the like.

Figure 4:
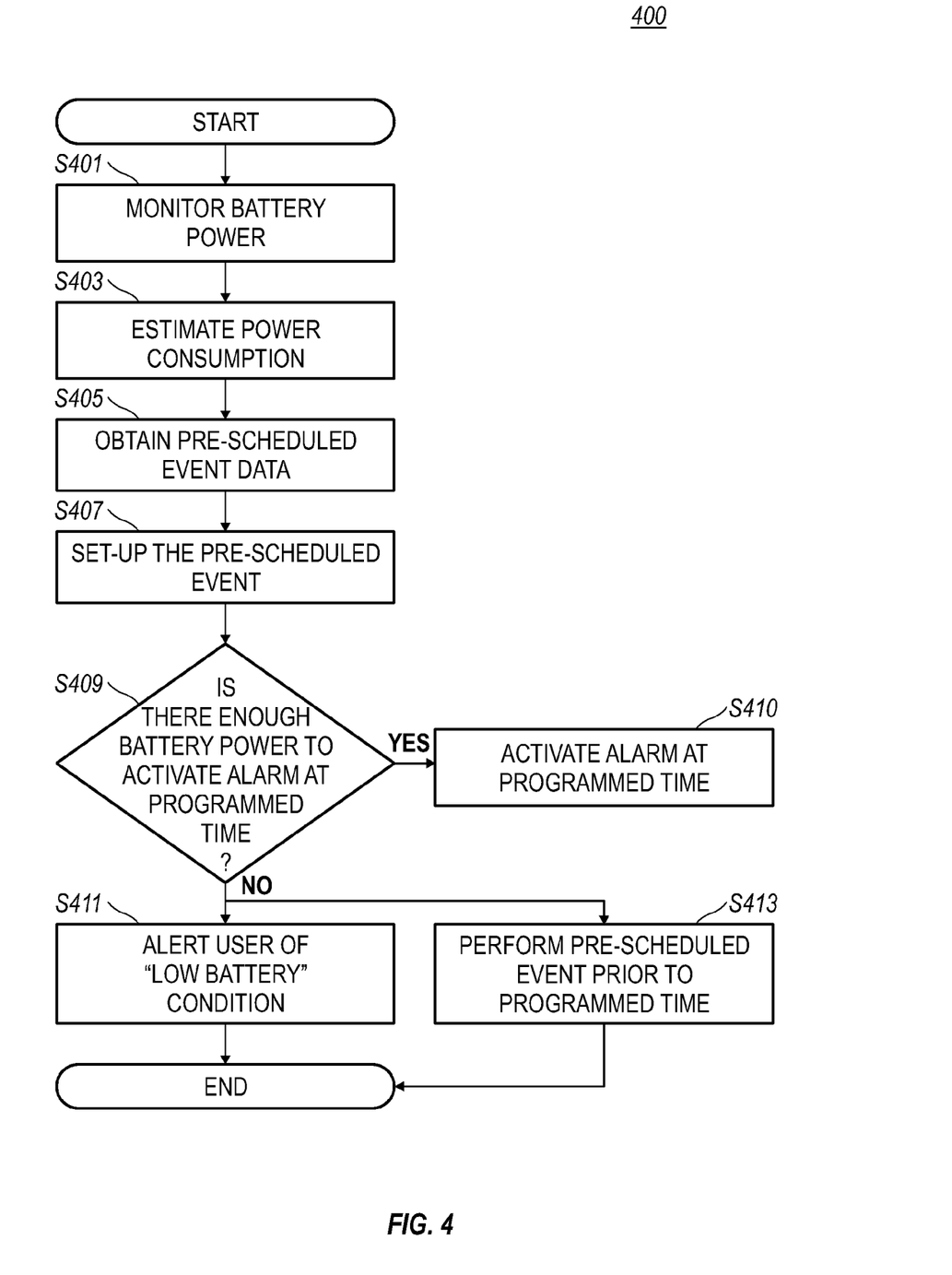
FIG. 4 is a flow chart illustrating a process performed on a mobile communication device to determine if sufficient battery power remains to activate an alarm at a programmed time according to one example.

FIG. 4 illustrates an example process diagram for performing a method 400 that includes monitoring battery power in step S401 and estimating power consumption of the mobile communication device 103 in step S403. The operating system 357 of the mobile communication device 103 obtains power data that may be processed to identify current power requirements of the mobile communication device and anticipate power requirements of the mobile communication device. The power data may include instantaneous battery draw data, average battery draw data, active application battery draw data, background application battery draw data, battery capacity data, battery discharge data, battery condition data, idle communication battery draw data, active communication battery draw data, device power usage history data, or the like.

The operating system 357 may obtain time-based data, including current time data, programmed pre-scheduled event time data, device active-use time data, device idle-time data or the like, from various applications and subsystems within mobile communication device 103. For example, the power data and time-based data can be sent to operating system 357 from device subsystem 342. In step S405, the operating system 357 also obtains pre-scheduled event data from a pre-scheduled event application 350. When the user sets a pre-scheduled event, the pre-scheduled event application 350 transmits the programmed event time to the operating system 357. The data obtained by the operating system 357 may be received in an order that is different from what is shown in FIG. 4. Thus, the operating system 357 can obtain data via steps S401, S403, and S405 concurrently or in any order.

According to one example, a pre-scheduled event may be set up in step S407. This event could be, for example, an alarm on the mobile communication device 103 that will be activated at a certain time. The data obtained by the operating system 357 is sent to the microprocessor 338, which then determines whether the mobile communication device 103 has sufficient battery power to perform the pre-scheduled event at the programmed time in step S409. If the microprocessor 338 determines that the mobile communication device 103 has sufficient battery power to perform the pre-scheduled event at the programmed time, then the alarm is activated in step S410 at the programmed time. Alternatively, if the mobile communication device 103 determines that there is insufficient battery power remaining to perform the pre-scheduled event, e.g., the battery will drain before the pre-scheduled event is performed, an alert will be generated to notify of a low battery condition in step S411. The low battery condition alert of step S411 may include a visual alert, an audible alert, a vibrate only alert, a message alert, or the like, presented on the display 222 or through an external device.

Instead or in addition to the generation of the low battery alert, if the microprocessor 338 determines that the battery will drain between the time the pre-scheduled event is set and the programmed time, the pre-scheduled event can be performed at a time prior to the programmed time at step S413. For example, the user may decide to set the alarm on their mobile communication device 103 at 11 PM the evening before an important telephone called scheduled for 9 AM the next day. The user may wish to set the alarm to go off at 8:15 AM the following morning in order to give them enough time to prepare for the phone call. If microprocessor 338 determines that the battery will drain before 8:15 AM the next morning, the low battery alert can be generated, alerting the user that the battery will drain prior to the programmed alarm time. Instead of or in addition to the generation of the low battery alert, the alarm can also be activated at an earlier time, e.g., 6:30 AM, which is prior to the scheduled alarm time. Thus, although the alarm will be activated before the time desired by the user, it will still alert the user to wake up. This scenario is preferred over a situation where the battery drains and the alarm does not sound at 8:15 AM, the programmed time.

Figure 5:
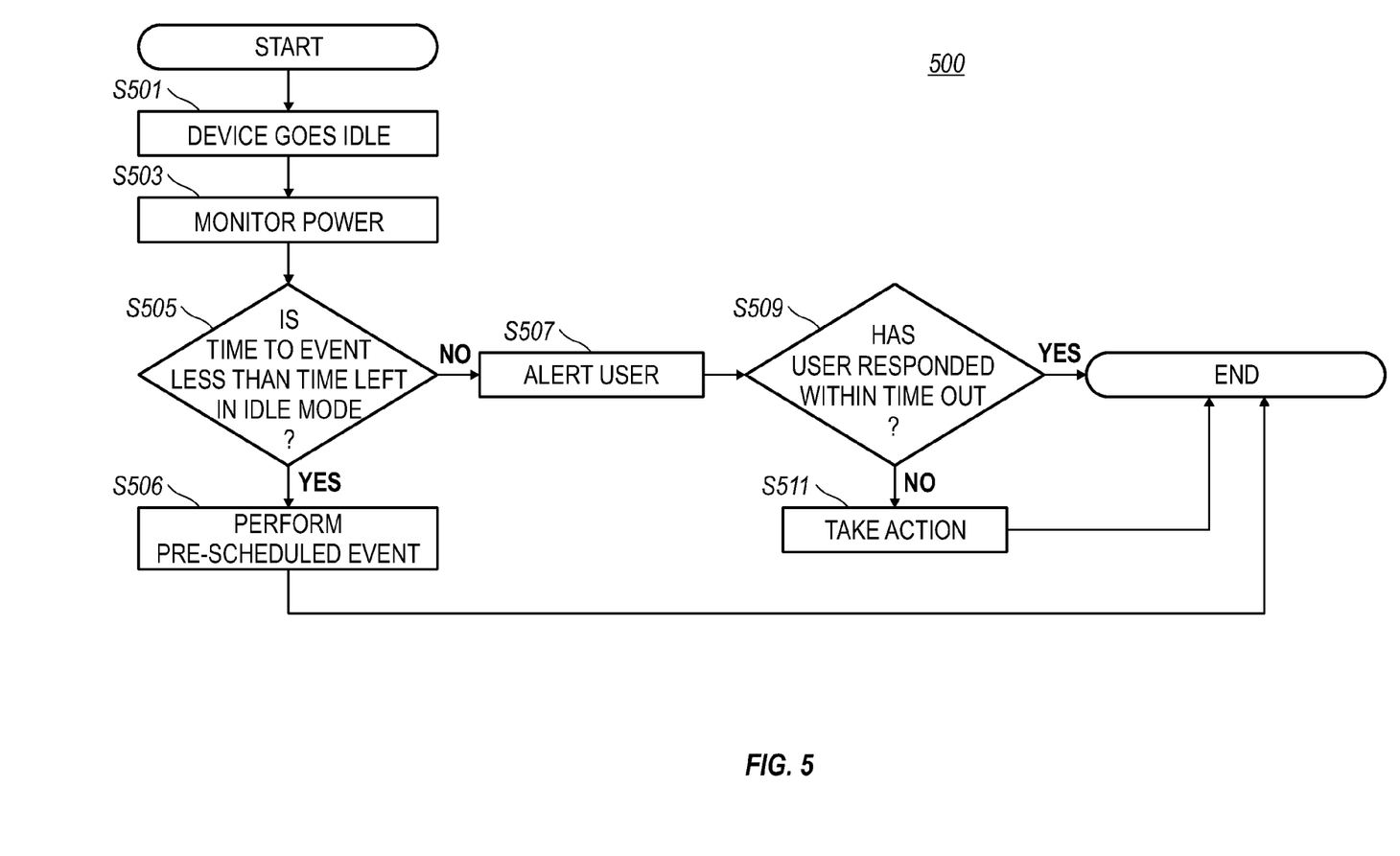
FIG. 5 is a flow chart illustrating a process performed on a mobile communication device to determine if sufficient battery power remains to activate an alarm at a programmed time according to another example.

FIG. 5 illustrates an example process diagram for performing a method 500 that includes determining when the mobile communication device 103 enters an idle state in step S501 and monitoring battery power of the mobile communication device 103 in step S503. As described above, the operating system 357 of the mobile communication device 103 obtains power data that may be processed to identify current power requirements of the mobile communication device 103. The data obtained by the operating system 357 is processed to determine whether a time calculated until an occurrence of a prescheduled event is less than battery charge time remaining in the idle mode, in step S505. If the time to the pre-scheduled event is less than the battery charge time remaining in idle mode, then the pre-scheduled event is performed at the scheduled time in step S506. If the time to the pre-scheduled event is greater than the battery charge time remaining in idle mode, then an alert is generated to notify the user that the battery power of the mobile communication device 103 will be depleted before the occurrence of the pre-scheduled event at step S507. The scheduled time may be substantially immediately. Again, this alert may include a visual alert, an audible alert, a vibrate only alert, a message alert, or the like, presented on the display 222 or through an external device.

If the alert is generated in step S507, the microprocessor 338 determines if the user has responded to the alert within a pre-set time-out period in step S509. If the user has not responded to the alert, a predetermined action is performed at step S511. This action could be, for example, reducing power to the mobile communication device 103, generating a second alert, or sending a message external to the mobile communication device 103. For example, a third party is notified that the user has not responded to the alert. This scenario is applicable, for example, when the user has either ignored or has not detected the alert and risk power to the mobile communication device 103 will be depleted when the time for the pre-scheduled event occurs. The third party can then contact the user through a device other than the mobile device 103 to advise of the predetermined event.

According to one example, a computer-implemented method of monitoring a communications device having a battery when operating without an external power source is provided. The method includes receiving instructions to perform an event at a pre-scheduled time, determining a first amount of time until the event is performed, detecting an idle mode of the communications device, the idle mode consuming a minimum amount of power, calculating a second amount of time until the battery is depleted, the second amount of time being calculated while the communications device operates in the idle mode, determining whether the second amount of time is less than the first amount of time, activating a first alert if the second amount of time is less than the first amount of time while remaining in the idle mode, and performing an action prior to the pre-scheduled time while remaining in the idle mode.

According to one example, a computer program product provided on a computer readable medium for monitoring a communications device having a battery. The computer program product includes computer instructions which, upon execution by a processor of the communications device, causes the processor to receive instructions to perform an event at a pre-scheduled time, determine a first amount of time until the event is performed, detect an idle mode of the communications device, the idle mode consuming a minimum amount of power, calculate a second amount of time until the battery is depleted, the second amount of time being calculated while the communications device operates in the idle mode, determine whether the second amount of time is less than the first amount of time, activate a first alert if the second amount of time is less than the first amount of time while remaining in the idle mode, and perform an action prior to the pre-scheduled time while remaining in the idle mode.

According to one example, a communications device is provided that includes a battery and a processor programmed to receive instructions to perform an event at a pre-scheduled time, determine a first amount of time until the event is performed, detect an idle mode of the communications device, the idle mode consuming a minimum amount of power, calculate a second amount of time until the battery is depleted, the second amount of time being calculated while the communications device operates in the idle mode, determine whether the second amount of time is less than the first amount of time, activate a first alert if the second amount of time is less than the first amount of time while remaining in the idle mode, and perform an action prior to the pre-scheduled time while remaining in the idle mode.

The disclosure may be implemented using hardware or software in association with hardware. In some examples, the software may include firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the disclosure may take the form of a computer program product that includes program modules accessible from computer-usable or computer-readable medium storing program code for use by or in connection with one or more computers, processors, or instruction execution system. The medium can be an electronic, magnetic, optical, electromagnetic, infrared, or semiconductor system (or apparatus or device) or a propagation medium (though propagation mediums in and of themselves as signal carriers are not included in the definition of physical non-transitory computer-readable medium). Examples of a physical non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some examples, the data processing system is implemented using one or both of FPGAs and ASICs.

We claim:

1. A computer-implemented method of monitoring a communications device having a battery, the method comprising:
   receiving instructions to perform an event at a pre-scheduled time;
   determining a first amount of time until the event is performed;
   detecting an idle mode of the communications device, the idle mode consuming a minimum amount of power;
   calculating a second amount of time until the battery is depleted, the second amount of time being calculated while the communications device operates in the idle mode;
   determining whether the second amount of time is less than the first amount of time;
   activating a first alert if the second amount of time is less than the first amount of time while remaining in the idle mode; and
   performing an action prior to the pre-scheduled time while remaining in the idle mode.

2. The computer-implemented method of claim 1, wherein the first alert includes at least one of a visual alert, an audible alert, and a vibration alert.

3. The computer-implemented method of claim 1, wherein the event includes at least one of an alarm event, a reminder event, a delayed email sending event, a notification event, a calendar reminder event, a messaging event, and an updating event.

4. The computer-implemented method of claim 1, wherein performing the action prior to the pre-scheduled time occurs substantially upon receiving the instructions to perform the event.

5. The computer-implemented method of claim 1, wherein performing the action includes performing at least one of reducing power to the communications device, generating a second alert, and transmitting a message external to the communications device.

6. The computer-implemented method of claim 1, wherein the first alert is a visual alert, further comprising presenting the first alert on a display of the communications device.

7. The computer-implemented method of claim 1, further comprising presenting the first alert on an external device.

8. A computer program product provided on a non-transitory computer readable medium for monitoring a communications device having a battery, the computer program product comprising computer instructions which, upon execution by a processor of the communications device, causes the processor to:
   receive instructions to perform an event at a pre-scheduled time;
   determine a first amount of time until the event is performed;
   detect an idle mode of the communications device, the idle mode consuming a minimum amount of power;
   calculate a second amount of time until the battery is depleted, the second amount of time being calculated while the communications device operates in the idle mode;
   determine whether the second amount of time is less than the first amount of time;
   activate a first alert if the second amount of time is less than the first amount of time while remaining in the idle mode; and
   perform an action prior to the pre-scheduled time while remaining in the idle mode.

9. The computer program product of claim 8, wherein the first alert includes at least one of a visual alert, an audible alert, and a vibration alert.

10. The computer program product of claim 8, wherein the event includes at least one of an alarm event, a reminder event, a delayed email sending event, a notification event, a calendar reminder event, a messaging event, and an updating event.

11. The computer program product of claim 8, wherein the action performed prior to the pre-scheduled time occurs substantially upon receiving the instructions to perform the event.

12. The computer program product of claim 8, wherein the action includes at least one of reducing power to the communications device, generating a second alert, and transmitting a message external to the communications device.

13. The computer program product of claim 8, wherein the first alert is a visual alert, the processor further programmed to present the first alert on a display of the communications device.

14. The computer program product of claim 11, wherein the processor is further programmed to present the first alert on an external device.

15. A communications device, comprising:
a battery;
a processor communicatively coupled to the battery;
a memory having stored therein instructions which, when executed by the processor, causes the processor to perform the steps comprising:
receiving instructions to perform an event at a pre-scheduled time;
determining a first amount of time until the event is performed;
detecting an idle mode of the communications device, the idle mode consuming a minimum amount of power;
calculating a second amount of time until the battery is depleted, the second amount of time being calculated while the communications device operates in the idle mode;
determining whether the second amount of time is less than the first amount of time;
activating a first alert if the second amount of time is less than the first amount of time while remaining in the idle mode; and
performing an action prior to the pre-scheduled time while remaining in the idle mode.

16. The communications device of claim 15, wherein the first alert includes at least one of a visual alert, an audible alert, and a vibration alert.

17. The communications device of claim 15, wherein the event includes at least one of an alarm event, a reminder event, a delayed email sending event, a notification event, a calendar reminder event, a messaging event, and an updating event.

18. The communications device of claim 15, wherein performing the action prior to the pre-scheduled time occurs substantially upon receiving the instructions to perform the event.

19. The communications device of claim 15, wherein performing the action includes performing at least one of reducing power to the communications device, generating a second alert, and transmitting a message external to the communications device.

20. The communications device of claim 15, wherein the first alert is a visual alert, the processor further programmed to present the first alert on the display of the communications device.

* * * * *